B. H. FLETCHER.
COMBINED WEEDER AND CULTIVATOR.
APPLICATION FILED JUNE 26, 1916.

1,218,541.

Patented Mar. 6, 1917.
3 SHEETS—SHEET 1.

Inventor
Byron H. Fletcher
by
Max A. Schmidt
Attorney

B. H. FLETCHER.
COMBINED WEEDER AND CULTIVATOR.
APPLICATION FILED JUNE 26, 1916.

1,218,541.

Patented Mar. 6, 1917.
3 SHEETS—SHEET 2.

Byron H. Fletcher
Inventor

By Max A. Schmidt
Attorney

B. H. FLETCHER.
COMBINED WEEDER AND CULTIVATOR.
APPLICATION FILED JUNE 26, 1916.
1,218,541.
Patented Mar. 6, 1917.
3 SHEETS—SHEET 3.
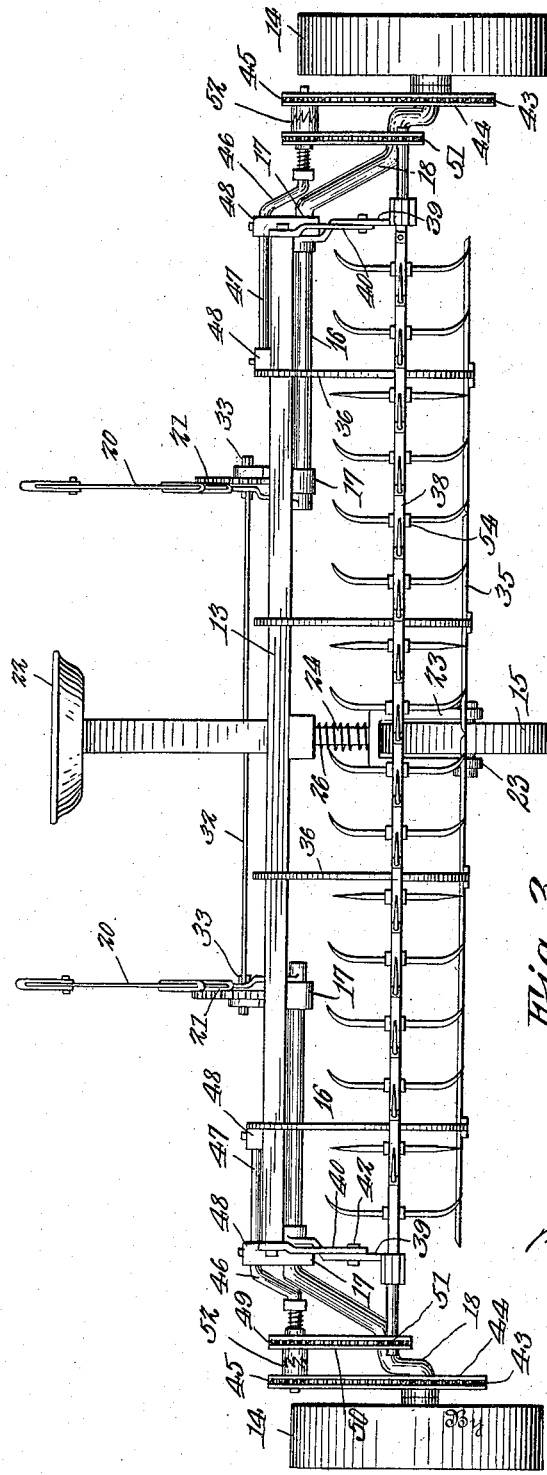
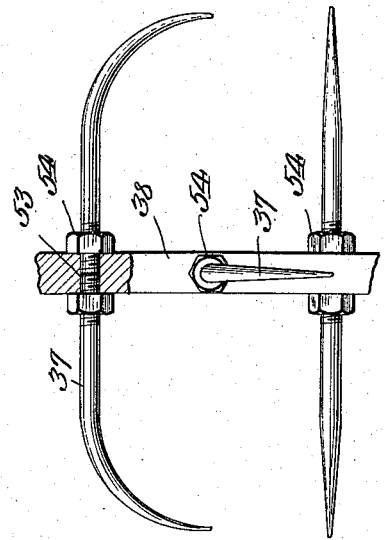
Fig. 3.
Fig. 4.
Byron H. Fletcher
Inventor
by
Max A. Schmidt
Attorney

UNITED STATES PATENT OFFICE.

BYRON H. FLETCHER, OF WALLA WALLA, WASHINGTON.

COMBINED WEEDER AND CULTIVATOR.

1,218,541.  Specification of Letters Patent.  Patented Mar. 6, 1917.

Application filed June 26, 1916. Serial No. 105,955.

*To all whom it may concern:*

Be it known that I, BYRON H. FLETCHER, a citizen of the United States, residing at Walla Walla, in the county of Walla Walla and State of Washington, have invented certain new and useful Improvements in Combined Weeders and Cultivators, of which the following is a specification.

This invention relates to agricultural machines designed to destroy weeds and at the same time to stir up or cultivate the ground.

The invention has for its object to provide a novel and improved machine of the kind stated, and one which is easily controlled, and which is highly efficient in operation.

With the object stated in view, the invention consists in a combination and arrangement of parts to be hereinafter described and claimed, and in order that the same may be better understood, reference is had to the accompanying drawings forming a part of this specification.

In the drawings,

Fig. 3 is a rear end view;

Fig. 4 is a sectional detail.

Figure 1:
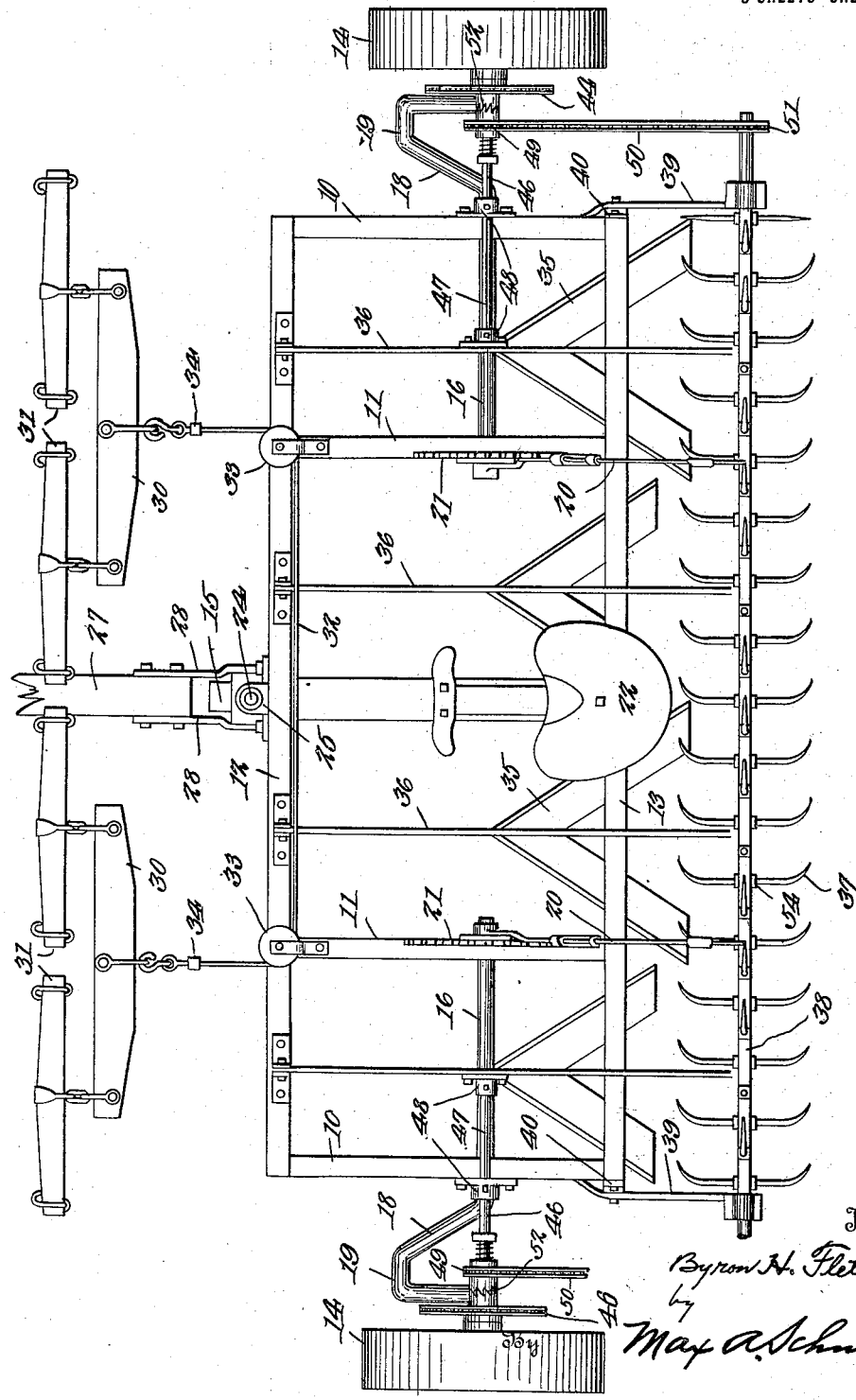
Figure 1 is a plan view of the machine.
Figure 2:
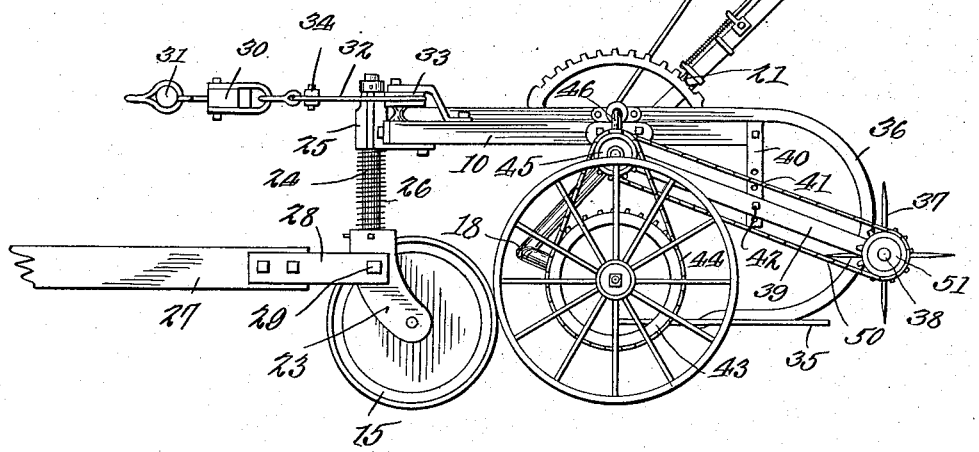
Fig. 2 is a side elevation thereof.
Figure 5:
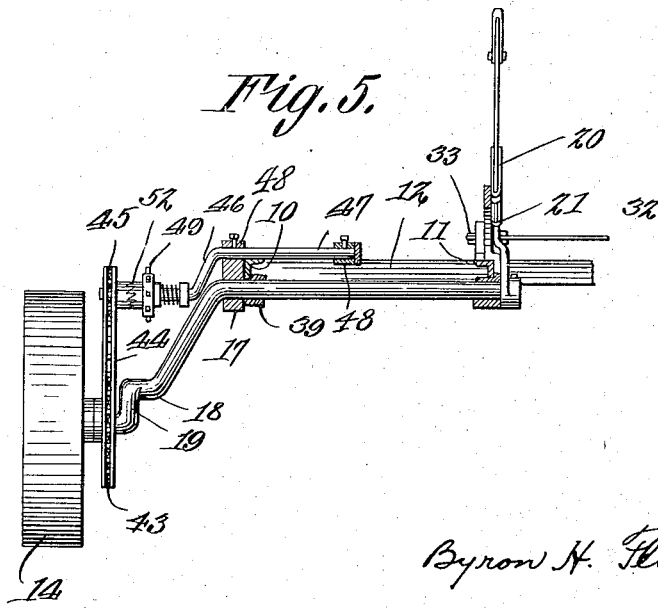
Fig. 5 is a rear end view, partly in section, of one side of the machine.

Referring specifically to the drawings, the frame of the machine comprises laterally spaced side bars 10 and intermediate bars 11, connected by front and rear cross bars 12 and 13, respectively. This frame is mounted on a pair of drive wheels 14 and a front steering wheel 15. Each drive wheel is carried by an axle 16 fixed in suitable bearings 17 on the frame and having a downward offset or crank bend 18 at its outer end loosely carrying the wheel, the latter turning on the axle. The offset also has a looped bend 19 to clear certain parts to be presently described. The axle is free to rock in the bearings 17, and its crank bend 18 serves to raise and lower the frame and the earth-working elements carried thereby when the axle is rocked. The axle is thus operated by a hand lever 20 fixed to its inner end and provided with the usual locking means 21. A seat for the driver is shown at 22.

The steering wheel 15 is carried by a fork 23 having an upright stem 24 journaled in a bearing 25 carried by the front cross bar 12, so that the wheel is free to swivel. Between the bearing 25 and the head or top of the fork 23 is a spring 26, the same being coiled around the stem 24, and serving to provide a yielding support for the frame. The spring keeps the frame level when the earth-working elements are in the ground, and also tends to hold the same in the ground when going over uneven surfaces, as the pull on said elements will tend to throw the forward end of the machine down and thus compress the spring.

A draft tongue or pole 27 is connected to the fork 23 by suitable straps 28 pivoted to the sides of the fork at 29. On opposite sides of the tongue are the usual doubletrees 30 carrying swingletrees 31. The doubletrees are connected to the frame of the machines by a cable 32, the latter being suitably connected at its ends to the respective doubletrees, and passing over pulleys 33 mounted on the front cross bar 12. On the draft cable 32 are stops 34 to limit the rearward movement of the respective ends thereof.

Two sets of earth-working elements are provided, one set being a row of V-shaped blades 35 extending transversely of the machine, and set flat with the ground to reduce friction. These blades cut the weeds and loosen the dirt, and they are carried by downwardly curved beams 36 suitably mounted on the frame of the machine.

The other set of earth-working elements is a row of revolving cultivator teeth 37 operating behind the blades 35 and fixed to a horizontal shaft 38 rotatably supported by bearing brackets 39 hung from the axles 16 and provided with a brace 40 depending from the ends of the rear cross bar 13. An adjustable connection is made between the brackets 39 and the braces 40, so that the former may be raised or lowered to regulate and vary the position of the teeth 37 with respect to the blades 35. This adjustable connection may be had by providing the braces with a series of bolt holes 41 for the bolts 42 which fasten the same to the brackets.

The shaft 38 is driven by the wheels 14 through the following gearing, a driving connection from each wheel being provided: To each wheel 14 is fixed a sprocket wheel 43 which is connected by a chain 44 to a smaller sprocket wheel 45 carried by the downwardly offset portion 46 of a counter-shaft 47 supported in bearings 48 on the frame of the machine. On the countershaft is also a sprocket wheel 49 which is connected by a chain 50 to a sprocket wheel 51 on the end of the shaft 38. The sprocket wheels 45 and 49 are loose on the countershaft, and a driving connection between the same is had by means of a suitable clutch 52. The offset 46 of the countershaft is in axial alinement with the axle 16, which brings the sprocket wheels 45 and 49 on the center about which the wheel 14 shifts when the axle is rocked to raise and lower the machine. The bends 19 are made to enable the axles to clear the drive chains 50 when the machine is operating at the maximum depth.

The cultivator teeth 37 extend straight outward from the shaft 38 and have their extremities curved sidewise and sharpened. Some of the teeth are straight throughout their entire length, these being the ones which are close to the beams 36, and they being straight so that they may clear said beams. The teeth may be connected to the shaft by having their inner ends threaded as shown at 53 and screwed into threaded apertures in the shaft, with lock nuts 54 screwed on the threaded portions of the teeth outside the shaft, and abutting against the latter.

The function of the teeth 37 operating behind the weeder blades 35 is to stir the dirt and throw the weeds out and upon the top of the ground. The drive gearing is so designed that the teeth revolve at a speed greater than that at which the machine travels.

I claim:

1. In a cultivator, a supporting frame, drive wheels, axles carried by the sides of the frame and having downward crank bends on which the drive wheels are journaled, bearings on the frame in which the axles are rockably supported, means connected to the axles for rocking the same, countershafts carried by the frame in axial alinement with the axles, driving members on the countershafts having connections with the drive wheels, rotary earth-working elements carried by the frame, and driving connections between said elements and the aforesaid driving members.

2. In a cultivator, a supporting frame, drive wheels, axles carried by the sides of the frame and having downward crank bends on which the drive wheels are journaled, bearings on the frame in which the axles are rockably supported, means connected to the axles for rocking the same, countershafts carried by the frame and having offsets which are in axial alinement with the axles, driving members loosely mounted on the offset portions of the countershafts and having connections with the drive wheels, rotary earth-working elements carried by the frame, and driving connections between said elements and the aforesaid driving members.

3. In a cultivator, a supporting frame, drive wheels and their axles carrying said frame, a series of weed cutting blades set horizontally and extending in a transverse row, a transverse shaft, cultivator teeth extending radially from the shaft and working behind the blades, bearing brackets supporting the shaft and hung on the axles, vertically adjustable brace connections between the brackets and the frame, and driving means for the shaft.

In testimony whereof I affix my signature in the presence of two witnesses.

BYRON H. FLETCHER.

Witnesses:
H. BROWN,
W. M. LOVE.

Copies of this patent may be obtained for five cents each, by addressing the "Commissioner of Patents, Washington, D. C."